US012427742B2

(12) United States Patent
Whited

(10) Patent No.: US 12,427,742 B2
(45) Date of Patent: Sep. 30, 2025

(54) EFFICIENT HYDRAULIC POWER UNITS FOR COMPREHENSIVE COMPACTOR AUTOMATION AND METHOD OF USING SAME

(71) Applicant: Fluid and Motion Control Technologies, LLC, La Center, WA (US)

(72) Inventor: Lowell Craig Whited, La Center, WA (US)

(73) Assignee: FLUID AND MOTION CONTROL TECHNOLOGIES, LLC, La Center, WA (US)

( * ) Notice: Subject to any disclaimer, the term of this patent is extended or adjusted under 35 U.S.C. 154(b) by 529 days.

(21) Appl. No.: 17/829,301

(22) Filed: May 31, 2022

(65) Prior Publication Data

US 2022/0379574 A1 Dec. 1, 2022

Related U.S. Application Data

(60) Provisional application No. 63/194,311, filed on May 28, 2021.

(51) Int. Cl.
*B30B 15/16* (2006.01)
*B30B 15/00* (2006.01)
(Continued)

(52) U.S. Cl.
CPC ........ *B30B 15/166* (2013.01); *B30B 15/0094* (2013.01); *B65F 1/1405* (2013.01); *F15B 11/08* (2013.01)

(58) Field of Classification Search
CPC ... B30B 1/1405; B30B 9/3007; B30B 9/3032; B30B 9/306; B30B 15/148;
(Continued)

(56) References Cited

U.S. PATENT DOCUMENTS 4,744,036 A * 5/1988 Van Tiggelen ....... B30B 15/026 72/481.2
4,860,646 A * 8/1989 Spiers ..................... B30B 15/18 91/401
(Continued)

FOREIGN PATENT DOCUMENTS

FR 2695346 A1 * 3/1994 ........... B30B 9/3007

OTHER PUBLICATIONS

Machine translation of FR 2 695 346 A1, retrieved in 2025, 7 pages (Year: 2025).*

*Primary Examiner* — Jimmy T Nguyen
(74) *Attorney, Agent, or Firm* — Blynn L. Shideler; Krisanne Shideler; BLK Law Group

(57) ABSTRACT

A hydraulic power unit for full compactor automation comprises a housing with a support frame, electrical control cabinet and plate cover; a reservoir; an electric motor on the frame; a hydraulic pump directly coupled to the motor; a CAN control system including a CAN controller, a gateway and antennae mounted to the housing and wherein the unit measures the current draw by the motor with a current transformer and wherein a signal level from the current transformer is fed to the CAN controller whereby decisions about the compactor's fullness are based on this signal level; an Integrated Circuit Hydraulic Manifold on the mounting plate including at least one Directional Control Valve, a Relief Valve, a Hydraulic Filter and a Check Valve; and an electronic entry PIN pad device on the electrical control cabinet allowing users to enter a personal identification number and operational commands.

15 Claims, 3 Drawing Sheets

(51) Int. Cl.
*B65F 1/14* (2006.01)
*F15B 11/08* (2006.01)

(58) Field of Classification Search
CPC . B30B 15/166; B30B 15/0094; B30B 15/281; F15B 11/08; F15B 11/10; B65F 1/1405
See application file for complete search history.

(56) References Cited

U.S. PATENT DOCUMENTS

| | | | | |
|---|---|---|---|---|
| 6,021,712 | A * | 2/2000 | Harrop | B30B 9/3007 100/229 A |
| 6,738,732 | B2 | 5/2004 | Durbin et al. | |
| 7,145,450 | B2 | 12/2006 | Brown | |
| 7,481,160 | B1 | 1/2009 | Simon et al. | |
| 7,926,419 | B1 | 4/2011 | Simon et al. | |
| 8,794,135 | B1 | 8/2014 | Simon et al. | |
| 9,694,973 | B2 | 7/2017 | Ullrich et al. | |
| 2005/0275556 | A1 * | 12/2005 | Brown | B30B 9/3007 340/531 |
| 2013/0319264 | A1 * | 12/2013 | McLaughlin | B30B 15/281 100/215 |
| 2016/0023417 | A1 * | 1/2016 | Hanson | B30B 9/301 100/99 |
| 2016/0221752 | A1 * | 8/2016 | Satwicz | B65F 1/1426 |

* cited by examiner

EFFICIENT HYDRAULIC POWER UNITS FOR COMPREHENSIVE COMPACTOR AUTOMATION AND METHOD OF USING SAME

RELATED APPLICATIONS

This application claims priority to U.S. Patent Application Ser. No. 63/194,311 filed Mar. 28, 2021 titled "Efficient Hydraulic Power Units for Comprehensive Compactor Automation and Method of Using Same" which application is incorporated herein in its entirety.

BACKGROUND INFORMATION

1. Field of the Invention

The present invention relates to improving compactor operation with an efficient hydraulic power unit, and more broadly to method of using hydraulic power unit for compactors which includes verified greenhouse emission reduction measurements.

2. Background Information

A compactor is a machine or mechanism used to reduce the size of material such as waste material or bio mass through compaction. Many retail and service businesses, such as fast food, restaurants, supermarkets and hotels, use compactors to reduce the volume of non-recyclable waste as well as curb nuisance such as rodents and smell. In the hospitality industry tolerance for such nuisances is particularly low. These compactors typically come in hydraulic operation, with fixed displacement rams and quite a few loading configurations. These compactors are almost exclusively of welded steel construction (analogous to roll off containers) for two reasons: durability under pressure and exposure to the elements, as compactors are installed either completely outdoors or sometimes under a covered loading dock. Typical compactor box sizes are 20 to 40 cubic yards, with an overall length between 20 and 24 feet.

Some compactors are described as stationary compactors which are primarily used for dry waste streams such as plastics, general trash, cardboard, etc. The compaction unit stays on the consumer premises at all times. The receiver (or box or hopper) is detached and hauled away for to a disposal or recycling facility and then returned quickly to the premises and easily hooked back up to the compaction unit. Some compactors are described as self-contained compactors which are mainly used for wet waste streams caused by grocery store products, meatpacking plant products and any other type of wet waste stream. Self-contained compactors can also process the same material as a stationary unit. To empty, the unit is unhooked from the power supply and the whole unit (compactor and receiver) are hauled away, disposed of, returned quickly and easily hooked back up to the power supply. As they are "self-contained" as a whole unit, they are used primarily for wet waste streams to prevent any leaks or environmental issues. It is also possible to replace the receiver of stationary units or the whole unit of the self-contained variety with a replacement unit to avoid returning until the next servicing Traditionally the retail and service business compactors were scheduled for a routine pick up and maintenance, whether the compactor needed emptying or not. This creates a significant waste in the system. The problem with this method is that the hauler will empty the container whether it has 2 tons or 8 tons of material, and the user pays the same for each haul no matter how much is in the container. It is true that often the disposal weight is billed separately, and if so this aspect will obviously vary from load to load based on the hauled container weight, but it is the labor and costs associated with hauling that represent the substantial and controllable costs. Automated solutions have attempted to decrease the inefficiency in these systems.

In the compactor space fullness sensors and automation have been added to move to a "just in time" or "on-demand" pick up/service business model and save in pick-up and delivery. There are two distinct and different on-demand methods. The first and most common is that a user, generally a given staff member at the company who uses the compactor or at a service company, monitors the pressure on the ram as it is being used. Once the pressure rises above a specific point, the monitoring staff member makes the decision to empty the container, then places the on-demand/just in time request a pickup. That same staff member is generally also responsible for follow-up in making sure the container is emptied on-time. The second on-demand method is based on the use of monitoring device and information system.

With the two major monitoring implementations, a monitoring device is placed at the compactor site. Specific sensors and monitoring computers are used to watch the compactor pressure and run-information. When the compactor is near full the monitor will send a message to either a staffed monitoring site (in the case of the first implementation) or directly to the hauler, in the case of second implementation. The follow-up using the first implementation system must be provided by the end-customer using the compactor & monitor or their service company. In the case of second implementation, generally follow-up is handled by the hauler or Service Company. The advantage of the hauler exclusively monitoring and servicing the compactors is that the consumer user does not have to educate a staff member on the details of the compactor other than basic operation, however a problem with any hauler exclusively monitoring their own compactors is that they may not be as responsive to the particular needs of a particular customer or site. The bottom line to servicing a commercial compactor is that user's should use a monitor because waste does not show up on a schedule and employees or broker supervisors cannot be on-top of when your compactor is truly near full or not full enough. Only a monitor can notify a compactor supervisor or the hauler within seconds of the near full condition and it has been estimated that the savings as a result of using a monitor can be between $2000 and $20,000 dollars per compactor each year depending on what type of service is currently in place.

For commercially available examples Envirodispose provides automation for compactors in the form of compactor sensor monitor measuring the fullness of the receiver or box, and the users can manage the compactor through an app on their mobile device (e.g., smartphone) and receive alerts when the box is full and needs servicing. A company called SmartTrash provides an automated compactor management system including a compactor monitor. After it is installed and calibrated, the system determines an optimal time to empty the compactor, and communicates with the waste hauler and other stakeholders, issuing orders for pickups. Waste-In-Motion is a company that provides an add on compactor monitor alone, called a dynamic compactor monitoring unit using motor sensing as a fullness measure. A company called Discovery also offers an add-on compactor monitor that "over time" is intended to "understand when equipment is in use and use this information to make optimal decisions" like on demand pick up requests.

U.S. Pat. No. 6,561,085, which is incorporated herein by reference, discloses a system for remotely managing a network of one or more waste compactor containers, each of which is associated with a monitoring unit and has a set of operating parameters including a container pick-up level. The system allows for the container pick-up level to be variably adjusted based upon one or more preselected conditions. When the present indication of compactor container fullness meets or exceed the presently adjusted pick-up level, a container pick-up request is generated. The variable adjustment of the container pick-up level, generally, takes the form of a setback amount, which alters the amount of compactor container fullness necessary for generating a pick-up request. The setback amount provides an automated approach for handling previously known interruptions or changes in container pick-up services.

U.S. Pat. No. 6,738,732, which is incorporated herein by reference, discloses a system for remotely managing a network of waste containers, each of which is associated with a monitoring unit. A central computer provides a dynamically updated display, via a display module having a full container window (or zone) which shows full containers, an alarm window (or zone) which shows non-full containers having an alarm condition, and a container status window (or zone) which shows non-full containers not having an alarm condition. The system additionally includes one or more remote monitors capable of providing user access to the container status information maintained by the central computer.

U.S. Pat. No. 6,738,732, which is incorporated herein by reference, discloses a system which monitors multiple pressure readings of the compactor assembly during each of one or more compaction cycles, and upon request, graphically displays the monitored information corresponding to one or more of the compaction cycles, thereby providing a visual indication of the operational status of the waste compactor container.

U.S. Pat. No. 7,145,450, which is incorporated herein by reference, discloses a compactor service and monitoring system in which compactor fullness and other critical parameters are monitored by an on-site processor. Compactor fullness is monitored using a pressure sensor capable of measuring hydraulic fluid system pressure for a compactor ram during a compactor compaction cycle. The processor generates a message indicating the compactor is full when the pressure is at least equal to a preset pressure for a preset time during a compaction cycle. Messages are sent via a wireless transmitter to a receiver that converts these messages into internet messages and directs them to a computer server database system. This system creates a work order in response to the message and sends the work order to a service provider via email. The email contains a link back to the database system web-site for tracking services provided by the recipient.

U.S. Pat. Nos. 7,926,419 and 8,794,135, which are incorporated herein by reference, disclose a waste compactor/container operational control with remote fullness monitoring and, remote performance and maintenance diagnostics. Such diagnostic information is transferred wirelessly or otherwise to one or more recipients, so as to directly provide a critical warning in real time.

U.S. Pat. No. 10,739,739, which is incorporated herein by reference, discloses a System for controlling electrically-powered trash compactors and receptacles using a volume measuring sensor.

The concept of compactor fullness monitoring is well establishes as is remote management and just in time pick up. It has been shown to lead to considerable savings (at least 25% of waste disposal and recycling costs by one estimate, while others have it as at least $2000 per container per year). However some of the sensing technologies are not well suited for the application such as those measuring only volume. As purely an illustrative example imagine filling the compactor with packing peanuts or leaves or other easily compressible products, some sensors indicate a full container merely because of the volume. Others are too expensive for the application leading to high upfront costs and minimizing their implementation. The only parties that can afford the high upfront investments are those with large waste disposal costs making the solutions impractical for most users. Other systems only provide an add-on fullness monitor and are not concerned with the operation of the system, yielding a less than comprehensive solution.

There remains a need for a simple effective, efficient method and apparatus for full compactor automation and management.

SUMMARY OF THE INVENTION

One embodiment of the present invention is directed toward A hydraulic power unit for full compactor automation comprising: a housing; a hydraulic fluid reservoir supported by the housing; an electric motor on the housing; a hydraulic pump directly coupled to the motor; a CAN control system mounted to the housing and wherein the hydraulic power unit measures the current draw by the electric motor and wherein a signal level associated with a measure of the current draw is fed to the CAN control system whereby decisions about the compactor's fullness are based on this signal level; and an integrated circuit hydraulic manifold mounted to the housing including at least one directional control valve, a relief valve, a hydraulic filter and a check valve.

One embodiment of the present invention is directed to A method of automating a compactor comprising the steps of: A) providing a hydraulic power unit for full compactor automation comprising: A metal housing with a support frame, electrical control cabinet and plate cover; A hydraulic fluid reservoir supported by the support frame and which includes hydraulic fluid quality sensors; An electric motor on the frame; A hydraulic pump directly coupled to the motor; A control system including a CAN controller, a gateway and antennae mounted to the housing; An Integrated Circuit Hydraulic Manifold on the mounting plate including at least one Directional Control Valve, a Relief Valve, a Hydraulic Filter and a Check Valve; and An electronic entry PIN pad device on the electrical control cabinet; B) Attaching the hydraulic power unit to the compactor; C) Operating the hydraulic power unit to control the operation of the compactor including the step of allowing users to enter a personal identification number and operational commands via the electronic entry PIN pad; D) Measuring the current draw by the motor when operating the pump with a current transformer; E) Feeding a signal level from the current transformer to the CAN controller; and F) Determining the compactor's fullness based on the signal level from the current transformer.

One embodiment of this invention is directed to a hydraulic power unit for full compactor automation comprising: a metal housing with a support frame, electrical control cabinet and plate cover; a hydraulic fluid reservoir supported by the support frame and which includes hydraulic fluid quality sensors; an electric motor on the frame; a hydraulic pump directly coupled to the motor; a control system including a CAN controller, a gateway and antennae mounted to the housing and wherein the unit measures the current draw by the motor with a current transformer and wherein a signal level from the current transformer is fed to the CAN controller whereby decisions about the compactor's fullness are based on this signal level; an Integrated Circuit Hydraulic Manifold on the mounting plate including at least one Directional Control Valve, a Relief Valve, a Hydraulic Filter and a Check Valve; and an electronic entry PIN pad device on the electrical control cabinet allowing users to enter a personal identification number and operational commands.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

Figure 1:
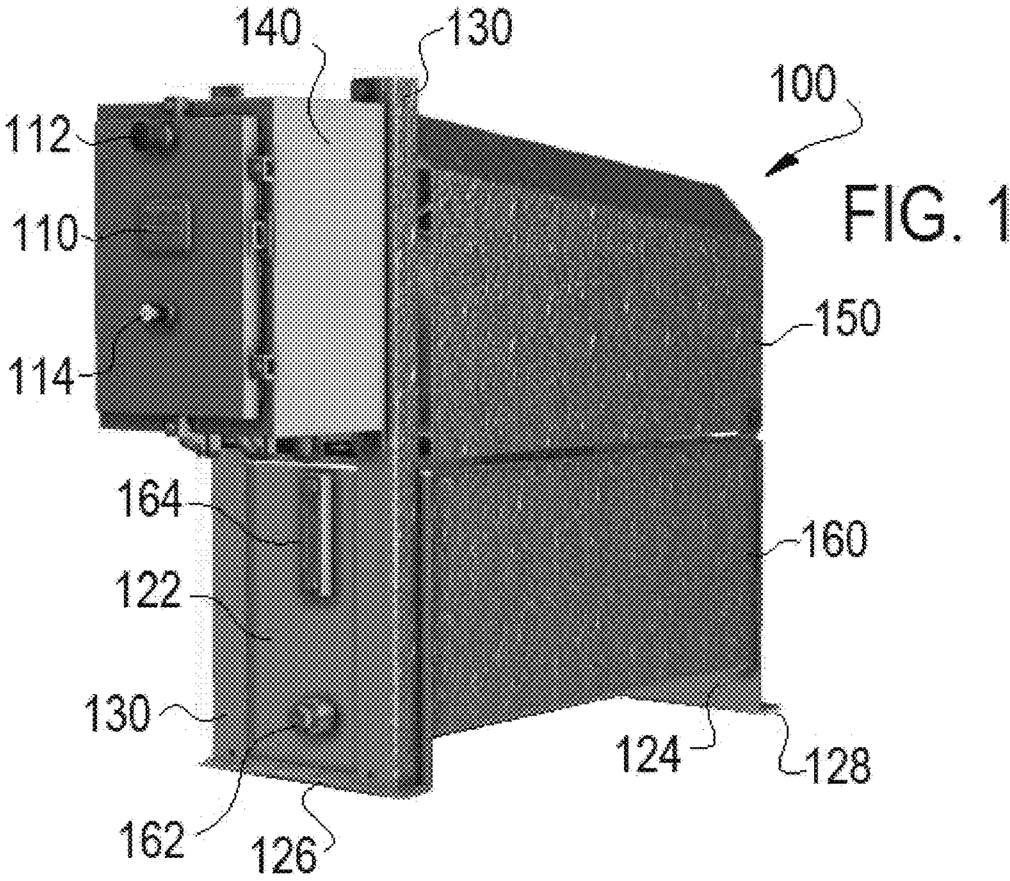
FIG. 1 is a perspective view of an efficient hydraulic power unit for full compactor automation according to one embodiment of the present invention.
Figure 2:
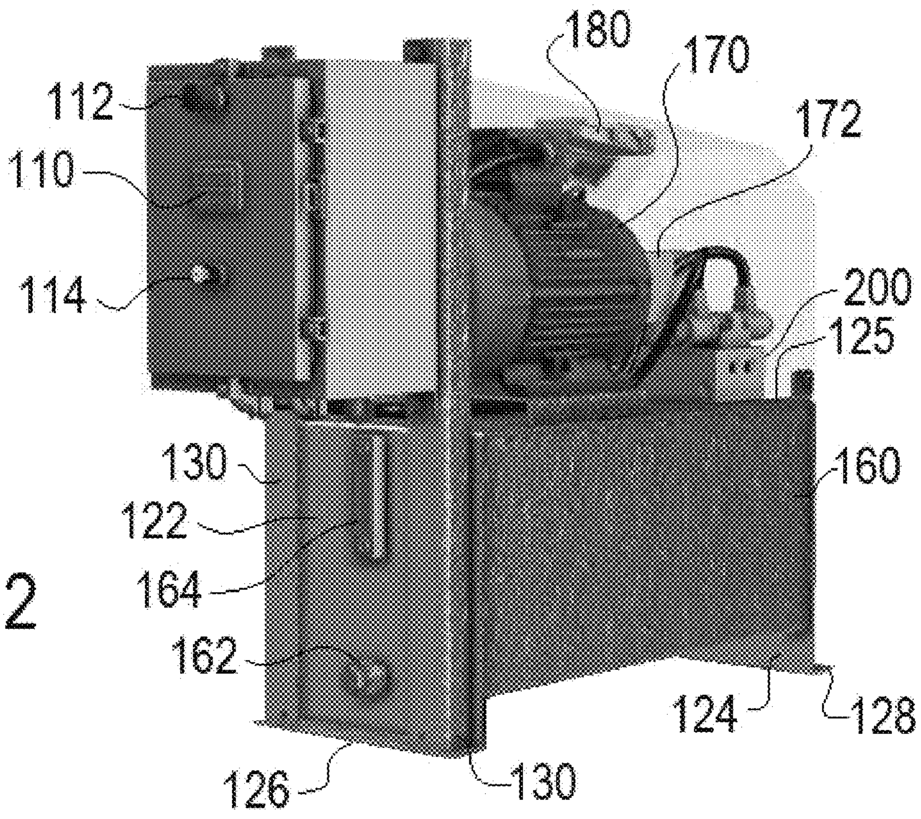
FIG. 2 is a perspective view of the hydraulic power unit for compactors of FIG. 1 with a cover removed for clarity.
Figure 3:
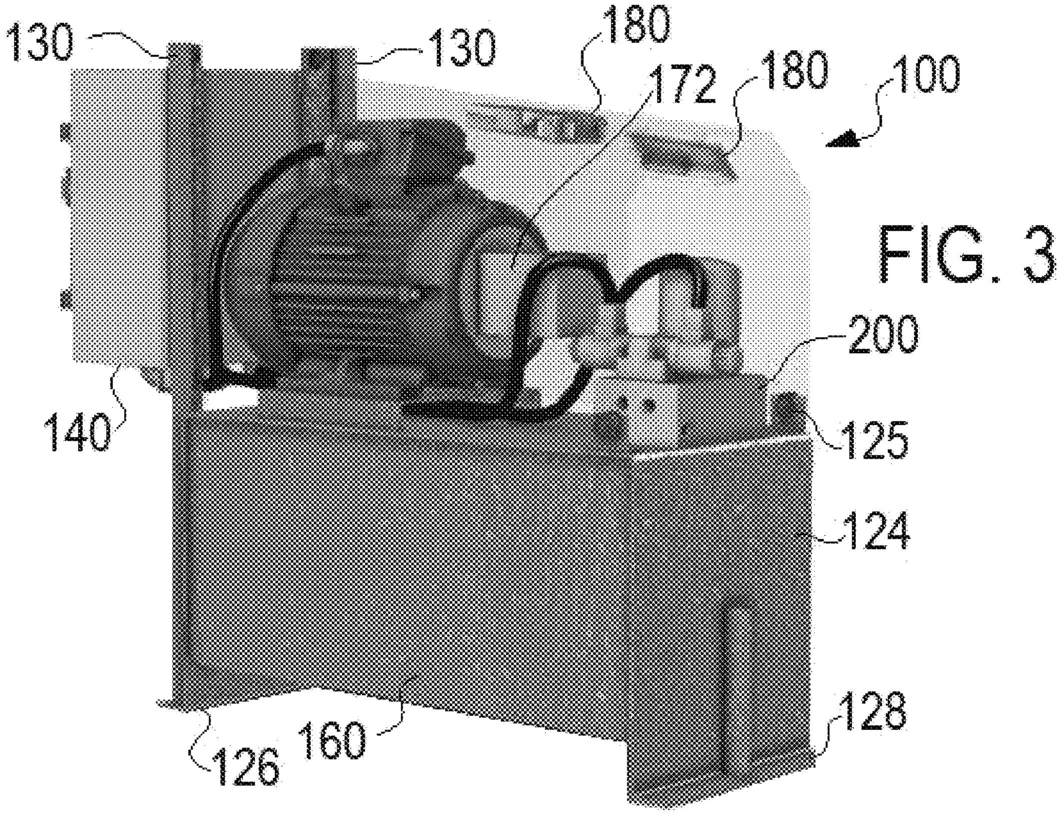
FIG. 3 is a rear perspective view of the hydraulic power unit for compactors of FIG. 2.

The efficient hydraulic power unit 100 for full compactor automation according to the present invention is intended for full compactor automation. Full compactor automation within the meaning of this specification means that that at least compactor fullness is monitored for on-time or just in time pick up requests, and at least some other system operational components or parameters are monitored, such as the hydraulic fluid characteristics, for system maintenance. Further, full compactor automation also means the unit 100 is coupled to the internet (or cloud) such that haulers and customers can have access to the information and allow for full review and control through downloadable apps on the customer or haulers phones, computers, tablets or the like.

The efficient hydraulic power unit 100 for full compactor automation according to the present invention is intended for use on compactors and balers (as a subset thereof). A baler is typically used for packaging of recyclable material. A common example is a cardboard baler is a piece of electronic equipment designed to crush and compact large amounts of cardboard into a single bale (typically ranging from 150-1, 800 lbs). Many balers use a fixed displacement ram as in a compactor and have the same issues with pick up requests for the formed bales. Thus in terms of the hydraulic power unit 100 of the present invention the baler will be considered a type of “compactor”, although traditionally a baler is considered as different from a traditional compactor.

The unit 100 provides an Intelligent Waste Systems and brings intelligent compacting to the market in a complete and easy to use package. In one package, the unit 100 combines ALL of the elements necessary to reduce carbon footprint, improve efficiency, control access and lower overall cost of ownership for a compactor. The unit 100 is an integrated complete hydraulic power unit, process control unit and communication unit all combined into one package that can be deployed to the most brutal environments. The unit 100 has installation, calibration and accuracy advantages over systems that monitor the condition of hydraulic power units manufactured by other. The unit 100 of the present invention as described herein brings the relevant aspects together into one package increasing ease of installation. The unit 100 utilizes a user interface available via the worldwide web that is user configurable. The unit 100, as elaborated below utilizes a CAN keypad 110 that can be native to the hydraulic power unit 100 on a cabinet 140 or remotely mounted for better access. This CAN keypad 110 can simply start/stop the machine and can also be configured to provide access control and messages about the unit's health.

The efficient hydraulic power unit 100 for full compactor automation includes a metal housing with a support frame, generally a steel plate frame. The frame includes a front plate 122 and a rear plate 124 with a horizontal mounting plate 125 there between. Supporting front feet 126 and rear feet 128 are coupled to the front plate 122 and rear plate 124, respectively. The frame includes front mounting channels 130 coupled to the front plate 122. The housing includes an electrical control cabinet 140 coupled to the mounting channels 130 and plate cover 150 above the mounting plate 125.

The electrical control cabinet 140 is a national Electrical Manufactures Association 4 type (NEMA 4) enclosure. This designation defines enclosures intended for indoor or outdoor use primarily to provide a degree of protection against windblown dust and rain, splashing water, and hose-directed water.

The steel frame supports a lower steel hydraulic fluid reservoir 160 mounted between the front plate 122 and the rear plate 124 and below the mounting plate 125 of the frame, typically a 20 gallon reservoir 160 for the hydraulic fluid. The hydraulic fluid will preferably be International Standards Organization Viscosity Grade 32 or Society of Automotive Engineers Grade 10 (ISO VG 32/SAE 10).

The hydraulic reservoir 160 includes a ¾" NPT drain plug 162 extending through the front plate 122 for draining the hydraulic fluid for replacement thereof from the reservoir 160. The reservoir 160 will include a sight gauge 164 extending through the front plate 122 for visual inspection of the hydraulic fluid in the reservoir 160. The sight gauge 164 mounted to the hydraulic reservoir 160 tells the user/inspector information about the hydraulic fluid level and condition (color) of the hydraulic fluid in the reservoir 160. The reservoir 160 will include a fill port and a filler breather element 166 for filling and conventional operation of the reservoir 160. The breather element 160 that is mounted to the hydraulic reservoir 160 filters air as the fluid level in the hydraulic reservoir 160 changes. It's optional for this breather element 166, itself, to act as a fill port, when removed, for the hydraulic reservoir 160.

The hydraulic reservoir 160 includes hydraulic fluid quality sensors such as a hydraulic fluid level indicator 168 for measuring the level of the fluid in the reservoir 160, which may be a float that is coupled to respective level switches and including a low and a high level indicator. The hydraulic fluid level indicator 168 may further include a temperature sensor for monitoring the temperature of the fluid in the reservoir 160 and/or of the fluid returning to the reservoir 160. Other hydraulic fluid quality measurement sensors may be provided in the reservoir 160 such as a particulate sensor for the hydraulic fluid returning to the reservoir 160.

The efficient hydraulic power unit 100 for full compactor automation includes an electric motor 170 on the mounting plate 125 that directly accepts a hydraulic pump 172. The motor 170 is a 10 horsepower 1775 RPM totally enclosed fan cooled (TEFC) motor with electric rating 208-230/480 VAC, 3-phase, 60 HZ. Despite the presence of the cover 150, the TEFC design for motor 170 is preferred due to the operational conditions. The motor 170 has a TYZ mounting face for direct mounting to the fixed displacement hydraulic pump 172. The pump 172 is a 6 gallon per minute fixed displacement hydraulic pump. The efficient hydraulic power unit 100 for full compactor automation includes a motor starter for the motor 170.

The efficient hydraulic power unit 100 for full compactor automation implements a control system including Controller Area Network (CAN) controller, Gateway and Antennae, collectively CAN Controller system 180. The CAN controller system 180 is robust towards electric disturbances and electromagnetic interference. The CAN protocol was officially released in 1986, and in 1993, the International Organization for Standardization (ISO) first released the CAN standard ISO 11898. The efficient hydraulic power unit 100 for full compactor automation uses a CAN controller and gateway as part of the system 180 that are independently sealed from water and dust. Preferably the CAN controller and gateway of the system 180 are mounted beneath the cover 150 and will not be mounted in the electrical enclosure 140. This mounting minimizes the size/cost of the electrical enclosure 140.

The antennae of the system 180 can be mounted essentially anywhere on the unit 100, but mounting this beneath the cover 150 minimizes incidental damage through accident or vandalism. The antennae communicates with the cellular, Ethernet, WiFi or satellite data network to transmit information from the unit 100 to the cloud where this information can be stored and acted upon (alerts engine, maintenance module, etc.).

The efficient hydraulic power unit 100 for full compactor automation incorporates an Integrated Circuit Hydraulic Manifold (ICHM) 200 on the mounting plate 125. The ICHM 200 includes one or two Directional Control Valve(s) 202, a Relief Valve 206, a Hydraulic Filter 204 and a Check Valve 208. The ICHM 200 is made from billet aluminum and, as noted above, houses the filter 204, check valve 208, relief valve 206 and directional control valve(s) 202.

Figure 4:
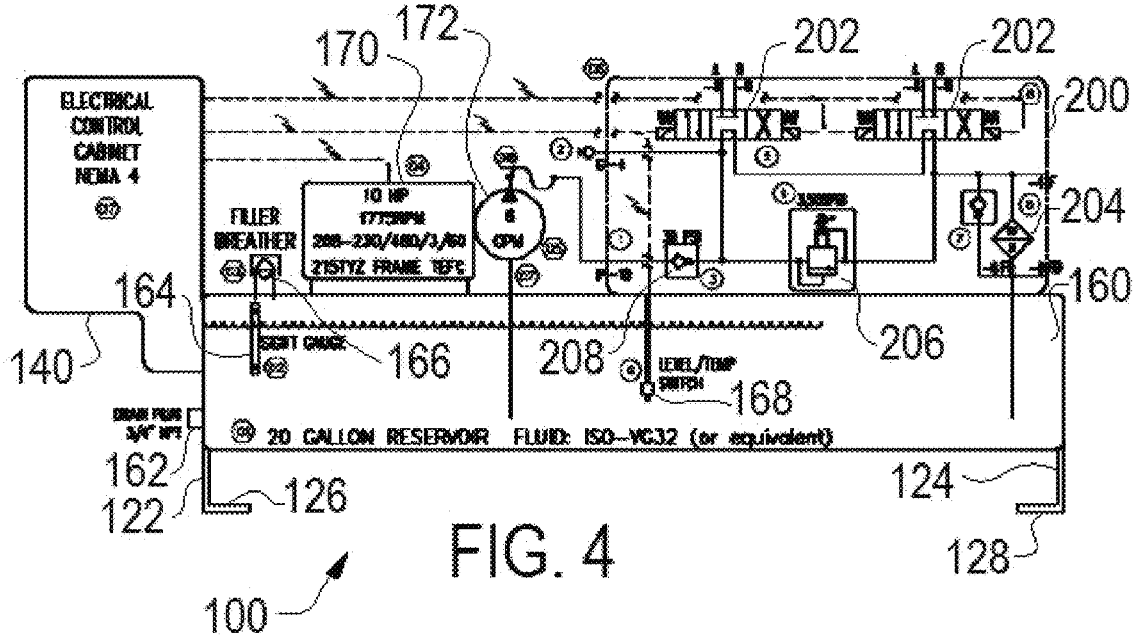
FIG. 4 is a view of hydraulic schematics for the hydraulic power unit of FIG. 1.
Figure 5:
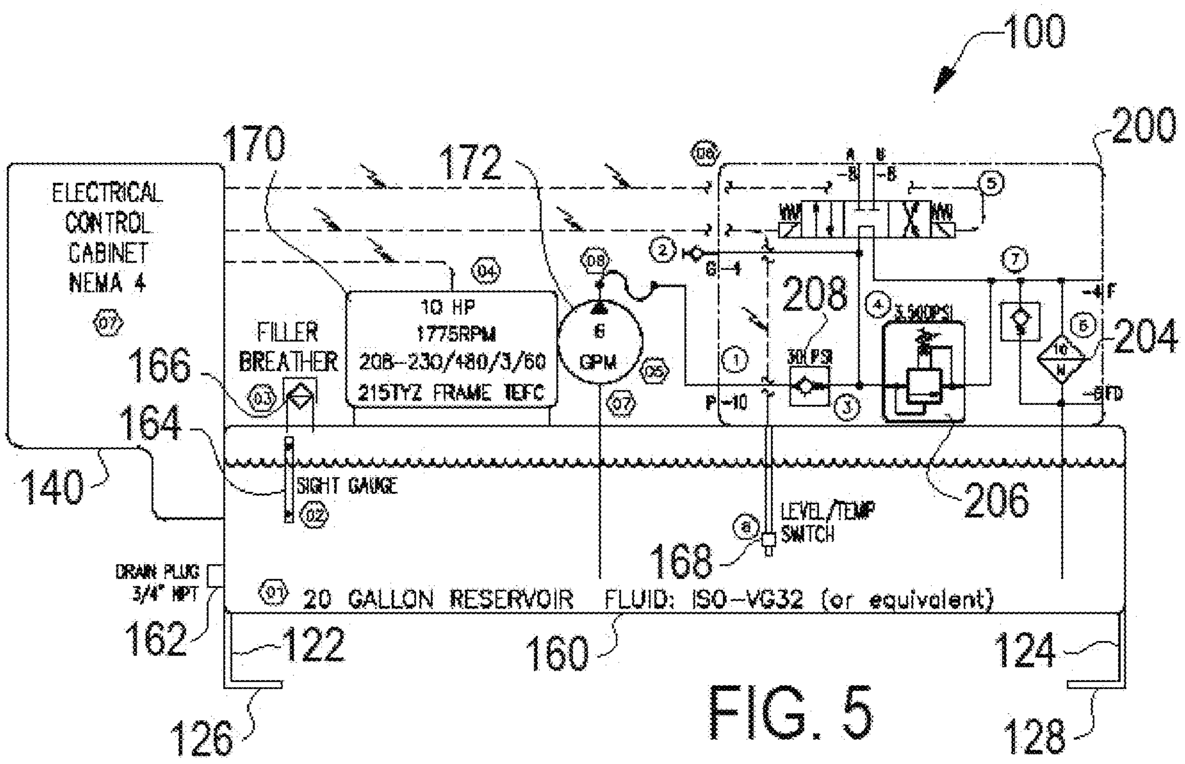
FIG. 5 is a view of modified hydraulic schematics for the hydraulic power unit of FIG. 1.

The pressurized fluid from the pump 172 is directed by the primary directional control valve 202 (or one of the directional control valves 202) to either make the compactor cylinders move forward or in reverse. A secondary directional control valve 2002 (as shown in FIG. 4) can be incorporated into the manifold 200 to control functions like a tipper. Each directional control valve 202 shifts to control direction via an electrical solenoid. The electrical signal for the solenoid comes from the CAN controller system 180.

The ICHM 200 houses the return filter 204. This filter 204 removes particulate and possibly water from the hydraulic fluid returning from the compactor or tipper or other function. The filter 204 is integrated into the ICHM 200. Further a filter cleanliness/particulate sensor may be integrated into the ICHM 200 and that signal fed to the CAN controller system 180 and that data to be displayed and acted on by the web interface.

The ICHM 200 houses the relief valve 206. If the pressure in the unit 100 rises above the set point of the relief valve 206 the relief valve 206 relieves the pressure to the hydraulic reservoir 200. Once the system pressure has been lowered the relief valve 206 closes. No user intervention is required in normal conditions to make the relief valve 206 function.

The ICHM 200 houses the check valve 208 which prevents pressurized fluid from returning to the pump 172 and rotating the pump shaft backwards.

The electrical control cabinet houses the CAN PIN or CAN keypad 110, an emergency or E-Stop Switch 112, and a Key Switch 114. The CAN keypad 110 is an electronic entry device allowing users to enter a personal identification number and operational commands. The CAN keypad 110 is CAN enabled. The configuration of the CAN controller system 180 can be such that the operator has the option to use the CAN keypad 110 to enter an access code which will allow the unit 100 to run. This PIN code can also be tracked and provide information on the specific user to yield, for example, a billing solution to the customer in scenarios where multiple customers use the same compactor, such as a strip mall. Therefore when a certain PIN code is entered on the CAN keypad 110, then that customer is billed for trash dumping. The specific user access code can further be used to track which particular employees are accessing and using the compactor without needing the separate billing aspects.

The CAN keypad 110 can used as the information and control center for the hydraulic power unit 100 with inputs other than merely a user identification or access code. The hydraulic power unit 100 is started and stopped from the CAN keypad 110, and the CAN keypad 110 can be viewed as including the unit 100 start button The CAN keypad 110 also is an information center in that via LED lights, it gives the customer information about the status of the unit 100 (running, stopped, fault, fullness levels).

The key switch 114 allows the user to turn off the hydraulic power unit 100 and walk away with the key, keeping others from running the unit w/o the key. The E-Stop switch 112 allows the user to stop all unit 100 functions immediately. The key and E-Stop are features that may be mandated by some industry standards in certain locations.

When the "start button" of the CAN keypad 110 is pushed, the electric motor 170 is started and in turn rotates the pump shaft of the pump 172. The pump 172 picks up low pressure fluid from the reservoir 160 and moves it to the integrated circuit hydraulic manifold (ICHM) 200.

When the compactor cylinders move forward to compact the trash or waste there is a resultant hydraulic pressure whose level is dictated by the fullness of the compactor. This hydraulic pressure causes a corresponding current (Amp) draw by the electric motor 170. The efficient hydraulic power unit 100 for full compactor automation measures the current draw by the motor 170 with a current transformer. The signal level from the current transformer is fed to the CAN controller system 180. The efficient hydraulic power unit 100 for full compactor automation make decisions about the compactor's fullness based on this signal level. The efficient hydraulic power unit 100 for full compactor automation also displays this signal in the web interface.

"Bridging" is another phenomenon encountered by compactors and occurs when the waste being compacted forward "jams" on itself and doesn't allow the waste to expand up and backwards to fill the voids. A "bridge" of hard compacted material thus forms between the ram and the front of the compactor. This can lead to higher hydraulic pressures, thus indicating a "full" unit, when in fact it might only be at 50% capacity. A bridging scenario can usually be solved through repeated cycling of the compactor, but the system must to know that's it is actually happening in the first case. It is common for a bridging scenario to indicate a full compactor (false full) situation, even though the unit is actually not full.

"False full" or "bridging" scenarios are avoided in the unit 100 by analyzing all the data sent by a compactor and the sensors on the unit 100. When the hydraulic power unit 100 for full compactor automation of the present invention detects a likely "bridging" episode it can actuate a repeated cycling procedure to alleviate the problem.

As noted above there is at least a low level hydraulic fluid sensor 168 mounted to the hydraulic reservoir 160 with an option for a high level hydraulic fluid sensor and a high temperature hydraulic fluid sensor and low temperature hydraulic fluid sensor. These signals are fed to the CAN controller system 180 where decisions can be made about how to control, start or stop the unit 100 as well as consider maintenance steps for the unit and/or compactor.

When the hydraulic power unit 100 tells the cloud based system that the compactor is full, the cloud based system can (based on user configuration) send an email or SMS to a person or machine that can schedule a pick-up/dump/return of the compactor. This function is handled by the alerts engine in the cloud. All of the system parameters that are sent to the cloud can be viewed in the web interface. The maintenance module in the cloud can monitor the hours on the hydraulic power unit 100 and send, via email or SMS, a reminder for the user to maintain the unit 100 and/or compactor (change oil, replace breather, replace filter, grease compactor, etc.).

The hydraulic power unit 100 of the invention monitors amperage loads on the electronic motor 170 and analytic software compiles data each time the unit 100 is cycled. "False full" or "bridging" scenarios are avoided by watching the data sent by a compactor. At the appropriate time a decision to service the unit 100 and/or compactor is made. The hauler is notified by phone or email preferably 24 hours in advance to service the unit 100/compactor. The customer also receives notice of service The hydraulic power unit 100 of the invention delivers a real world, tangible green solution that reduce the user's carbon footprint in furtherance of sustainability goals. Additionally the hydraulic power unit 100 of the invention allows for a quantification of this reduction by tracking the reduced number of hauls as well as the power requirements of the unit 100.

The hydraulic power unit 100 of the invention is designed to provide an immediate Return-on-Investment (ROI) allowing for easy implantation regardless of volume of use of a user. The unit 100 will minimize the number of hauls and maximize compactor tonnages, while identifying "Bridging" and remediating scenarios. The unit 100 will automatically dispatch a pickup ahead of time and track individual compactor data over time to identify trends The hydraulic power unit 100 of the invention does not require modification of the compactor equipment and thus can be easily retrofitted into existing compactors.

While the invention has been shown in several particular embodiments it should be clear that various modifications may be made to the present invention without departing from the spirit and scope thereof. The scope of the present invention is defined by the appended claims and equivalents thereto.

What is claimed is:

1. A hydraulic power unit for full compactor automation comprising:

A housing, wherein the housing includes a support frame, an electrical control cabinet and a plate cover, wherein the support frame includes a front plate and a rear plate with a horizontal mounting plate there between, and wherein the frame includes front mounting channels coupled to the front plate, wherein the electrical control cabinet is coupled to the mounting channels, and wherein the plate cover is above the mounting plate;

A hydraulic fluid reservoir supported by the housing;

An electric motor on the housing;

A hydraulic pump directly coupled to the motor;

A Controller Area Network (CAN) control system mounted to the housing and wherein the hydraulic power unit measures a current draw by the electric motor and wherein a signal level associated with a measure of the current draw is fed to the Controller Area Network (CAN) control system whereby decisions about a compactor's fullness are based on the signal level; and An Integrated Circuit Hydraulic Manifold mounted to the housing including at least one Directional Control Valve, a Relief Valve, a Hydraulic Filter and a Check Valve.

2. The hydraulic power unit according to claim 1, further including an electronic entry PIN pad device on the electrical control cabinet allowing users to enter a personal identification number and operational commands.

3. The hydraulic power unit according to claim 1, wherein the hydraulic fluid reservoir is supported by the support frame and further includes hydraulic fluid quality sensors.

4. The hydraulic power unit according to claim 1, wherein the Controller Area Network (CAN) control system includes a Controller Area Network (CAN) controller, a gateway and antennae.

5. The hydraulic power unit according to claim 1, wherein the hydraulic power unit measures the current draw by the electric motor with a current transformer.

6. The hydraulic power unit according to claim 1, wherein the hydraulic fluid reservoir includes a drain plug extending through the front plate for draining the hydraulic fluid and the reservoir includes a sight gauge extending through the front plate for visual inspection of the hydraulic fluid in the reservoir.

7. The hydraulic power unit according to claim 1 wherein the motor is a totally enclosed fan cooled (TEFC) motor, and wherein the motor has a mounting face for direct mounting to the pump.

8. The hydraulic power unit according to claim 7 wherein the pump is a fixed displacement hydraulic pump.

9. The hydraulic power unit according to claim 4, wherein the Controller Area Network (CAN) controller and gateway of the Controller Area Network (CAN) control system are not mounted in the electrical control cabinet.

10. The hydraulic power unit according to claim 1, wherein the electrical control cabinet houses an electronic entry PIN pad device, an emergency Stop Switch, and a Key Switch.

11. The hydraulic power unit according to claim 1, wherein the Integrated Circuit Hydraulic Manifold includes two Directional Control Valves.

12. The hydraulic power unit according to claim 1, wherein the Integrated Circuit Hydraulic Manifold is aluminum.

13. The hydraulic power unit according to claim 1 further including a cloud based component in communication with the hydraulic power unit wherein when the hydraulic power unit tells the cloud based system that the unit is full, the cloud based system can schedule a pick-up/dump/return of the compactor by an alerts engine in the cloud.

14. The hydraulic power unit according to claim 13 wherein all of system parameters that are sent to the cloud can be viewed in a web interface.

15. The hydraulic power unit according to claim 13 wherein a maintenance module in the cloud can monitor the hours on the hydraulic power unit and send a maintenance reminder.

* * * * *